Oct. 21, 1941.     J. R. MORRIS     2,259,765
SHEET GLASS BREAKING APPARATUS
Filed Sept. 25, 1939     5 Sheets-Sheet 1

Inventor
JOSEPH R. MORRIS.
By Frank Fraser
Attorney

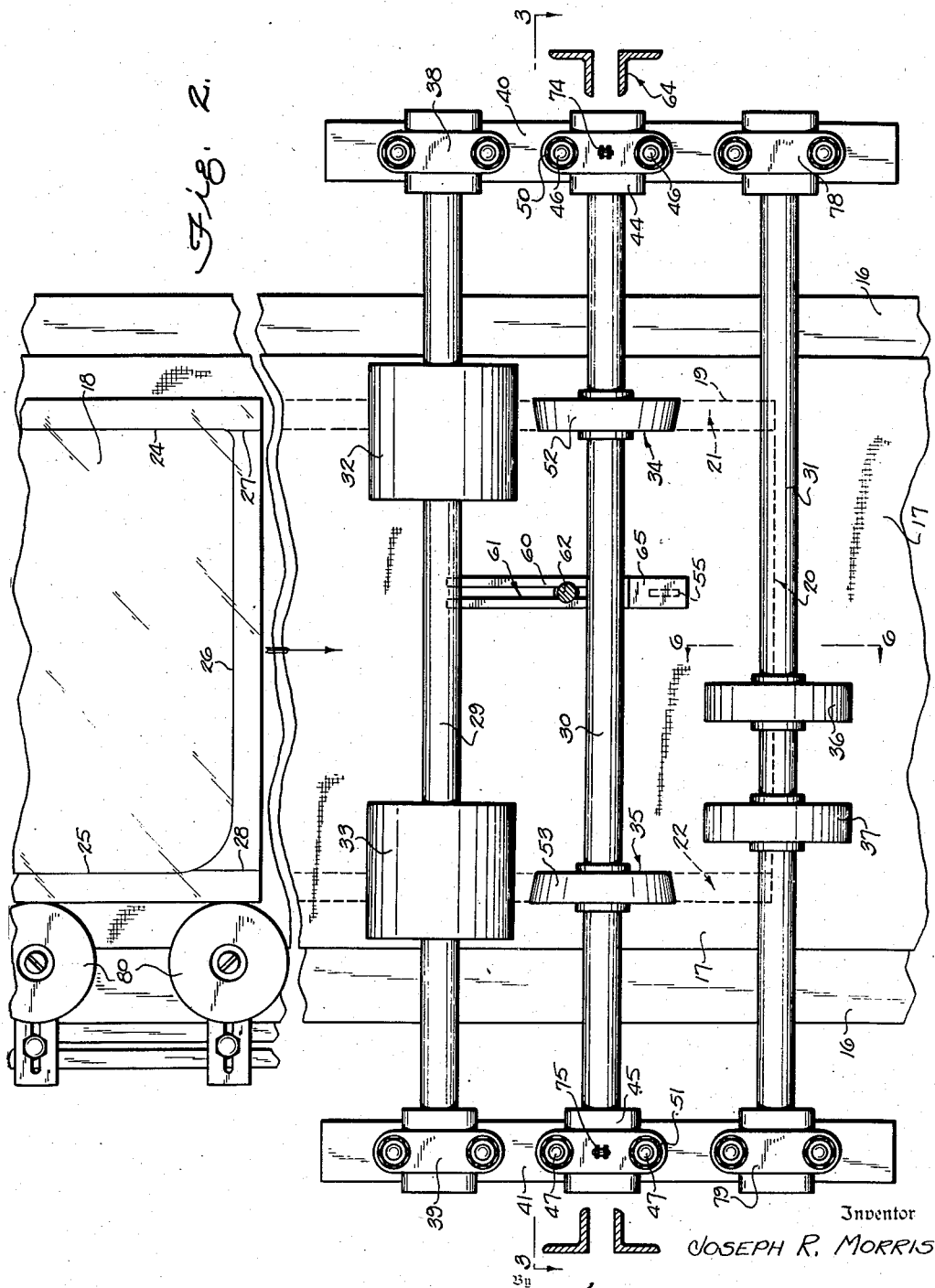

Oct. 21, 1941.   J. R. MORRIS   2,259,765
SHEET GLASS BREAKING APPARATUS
Filed Sept. 25, 1939   5 Sheets-Sheet 3

Inventor
JOSEPH R. MORRIS.
By Frank Fraser
Attorney

Oct. 21, 1941.　　　J. R. MORRIS　　　2,259,765
SHEET GLASS BREAKING APPARATUS
Filed Sept. 25, 1939　　　5 Sheets-Sheet 4

Inventor
JOSEPH R. MORRIS.
Frank Fraser
Attorney

Oct. 21, 1941.    J. R. MORRIS    2,259,765
SHEET GLASS BREAKING APPARATUS
Filed Sept. 25, 1939    5 Sheets-Sheet 5

Inventor
JOSEPH R. MORRIS.
By Frank Fraser
Attorney

Patented Oct. 21, 1941

2,259,765

UNITED STATES PATENT OFFICE 2,259,765

SHEET GLASS BREAKING APPARATUS

Joseph R. Morris, Toledo, Ohio, assignor to Libbey-Owens-Ford Glass Company, Toledo, Ohio, a corporation of Ohio Application September 25, 1939, Serial No. 296,443

20 Claims. (Cl. 49—48)

The present invention relates generally to the cutting of glass sheets and more particularly to the breaking or cracking of said sheets subsequent to the scoring thereof along predetermined lines of cut.

An aim of the invention is the provision of improved apparatus of simple, reliable construction which will operate to automatically break the glass sheets along the score lines as the said sheets are being carried continuously forwardly; the apparatus operating in a positive, efficient manner so that a clean sharp break may be had and uniform results obtained in the cracking of a large number of successive sheets.

Another object of the invention is the provision of apparatus of the above character embodying means for breaking the glass sheets along substantially parallel score lines extending in the direction of travel of said sheets and also along score lines extending transversely thereof; said means being operable to crack the sheets along the score lines in substantially the same fashion as they would be broken manually by an experienced operator, whereby danger of breakage of the glass and the liability of chipping or spalling of the sheet edges is reduced to a minimum.

Other objects and advantages of the invention will become more apparent during the course of the following description, when taken in connection with the accompanying drawings.

In the drawings, wherein like numerals are employed to designate like parts throughout the same:

Fig. 2 is a plan view of the breaking apparatus;

Figure 1:
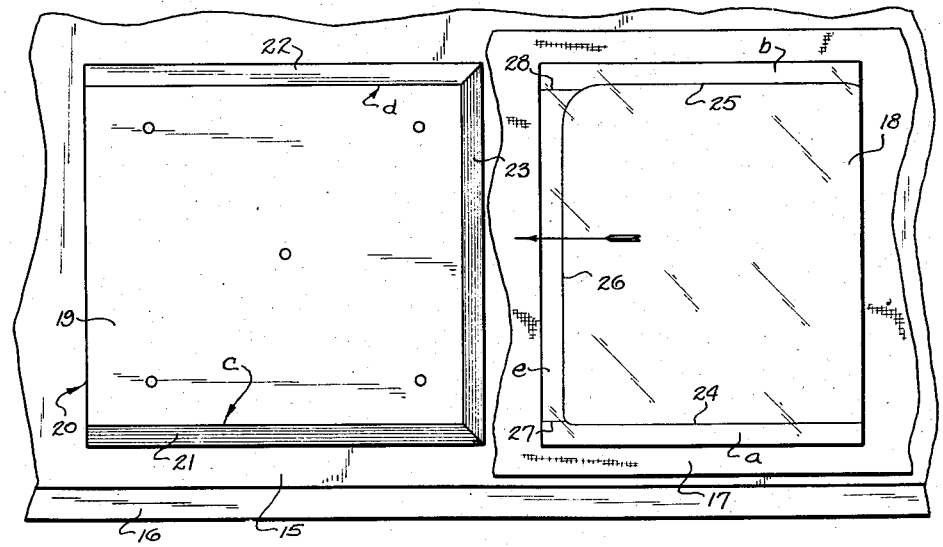
Fig. 1 is a plan view showing a scored sheet of glass to be broken supported upon the conveying means, a portion of which is broken away to show the cracking-off plate.

In the embodiment of the invention illustrated in Figs. 1 to 6, inclusive, there is provided a longitudinally extending horizontal supporting table or the like 15 carried at its opposite sides by the supports 16—16. Extending longitudinally of the table 15 is an endless conveyor belt 17 for supporting the scored sheet of glass 18 to be broken and for carrying the same beneath the breaking apparatus to be hereinafter described. The upper flight of the conveyor belt 17 is adapted to slide forwardly over the upper surface of the table 15 and the said belt may be suitably mounted and driven in the direction indicated by the arrow in Fig. 1.

Suitably secured to the upper surface of the table 15, at a point intermediate the length thereof, is a cracking-off plate 19 which is of a width corresponding substantially to the width of the glass sheet after it has been broken along the score lines. The cracking-off plate 19 is here shown as being rectangular and having an abrupt front edge 20, while the marginal edge portions of the plate, along the opposite sides and also across the back thereof, are beveled as at 21, 22, and 23 respectively. The glass sheet 18 is provided with the two substantially parallel score lines 24 and 25 extending adjacent the opposite side edges thereof and connected adjacent its front edge by the transverse score line 26. To facilitate the cracking off of the glass outwardly of the score lines 24 and 25, there are provided the two so-called entering cuts or vents 27 and 28 which extend from the transverse score line 26 outwardly to the forward edge of the sheet. Although the entering cuts 27 and 28 are shown as being disposed slightly inwardly of the score lines 24 and 25, they may be in alignment therewith if desired.

While the invention is not limited to the breaking of any particular shape or size of glass sheet scored in any special manner, it is especially applicable to the breaking of door and window lights or half windshields for automobiles and the like scored both longitudinally and transversely in the manner shown in Fig. 1.

The cracking-off plate 19 is of substantially the same width as the glass sheet 18 so that the marginal portions $a$ and $b$ of the glass sheet, outwardly of score lines 24 and 25, overhang the beveled marginal portions 21 and 22 respectively of the cracking-off plate when the glass sheet is carried thereover upon the conveyor belt 17.

The width of the cracking-off plate is such that the points at which the marginal portions 21 and 22 thereof begin to bevel, as indicated at c and d respectively, are preferably disposed directly beneath the score lines 24 and 25 (although they need not be in exact vertical alignment therewith) so that only a relatively slight amount of pressure is required to cause the glass to crack along the lines 24 and 25 and also along the lines 27 and 28. When the glass sheet is in proper position upon the cracking-off plate 19 so that the transverse score line 26 is in substantial alignment with the front edge 20 of said cracking-off plate, the marginal portion e of the sheet, outwardly of said score line, can also be broken off with relatively little pressure. The principal reason for having the rear marginal portion 23 of the cracking-off plate beveled is to facilitate the raising of the forward edge of the glass sheet and the passing of said sheet forwardly onto the cracking-off plate.

Extending transversely of the table 15 and mounted above the cracking-off plate 19 are the three horizontal parallel shafts 29, 30, and 31 upon which are mounted respectively the hold-down rollers 32 and 33; the cracking-off rollers 34 and 35; and the snapping rollers 36 and 37.

The shaft 29 carrying the hold-down rollers 32 and 33 is journaled at its opposite ends in fixed bearings 38 and 39 mounted upon stationary horizontal supporting members 40 and 41 carried by vertical posts 42 and 43 respectively. The main purpose of the rollers 32 and 33 is to hold the glass sheet 18 downwardly in proper position with respect to the cracking-off plate 19 during the forward movement thereof and also to prevent slippage of said sheet with respect to said cracking-off plate during the breaking of the sheet along the score lines. The hold-down rollers 32 and 33 may be moved longitudinally upon shaft 29 to the desired positions or, if preferred, a single long roller may be used.

The shaft 30 carrying the cracking-off rollers 34 and 35 is journaled at its opposite ends in bearings 44 and 45 which are mounted for vertical sliding movement upon pairs of vertical bolts 46 and 47 respectively also carried by the horizontal supporting members 40 and 41. The rollers 34 and 35 are normally urged downwardly to yieldably engage the glass sheet as it passes therebeneath by means of tension springs 48 and 49 encircling the bolts 46 and 47 respectively and bearing at their upper ends against nuts 50 and 51.

The peripheries of the cracking-off rollers 34 and 35 are beveled as at 52 and 53 respectively to correspond substantially to the beveled marginal portions 21 and 22 of the cracking-off plate 19. In practice, the cracking-off rollers are adapted to be disposed in lowered position so as to engage the marginal edge portions a and b of the glass sheet, outwardly of the longitudinal score lines, as the said sheet is carried therebeneath. The pressure exerted by the rollers upon the sheet will cause the glass to crack initially along the score lines 27 and 28 and this cracking will then be continued, as the glass moves forwardly, along the score lines 24 and 25 so that the entire side edges of the sheet are removed without any attention on the part of the operator.

It is preferred, however, that the cracking-off rollers be lifted from the glass sheet as soon as the sheet has been broken to prevent crushing of those portions of the glass removed from the sheet and so that the danger of chipping or marring of the sheet edges will be avoided. It is also desirable that the cracking-off rollers be maintained in engagement with the glass only sufficiently long to effect the breaking operation, so that they will function to crack the glass in substantially the same manner as would be accomplished manually by a skilled operator. In this way, clean, sharp breaks can be obtained in a thoroughly practical and efficient manner.

Figure 4:
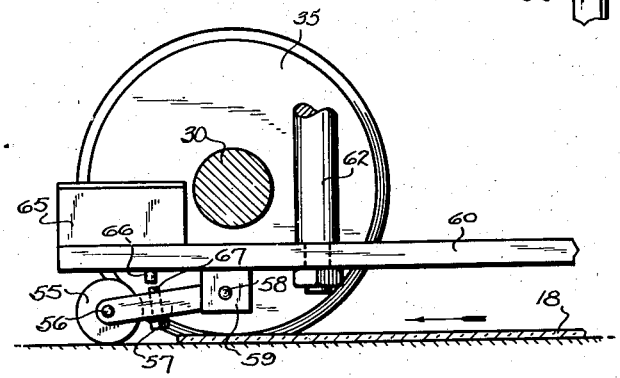
Fig. 4 is a longitudinal section taken substantially on line 4—4 of Fig. 3.
Figure 5:
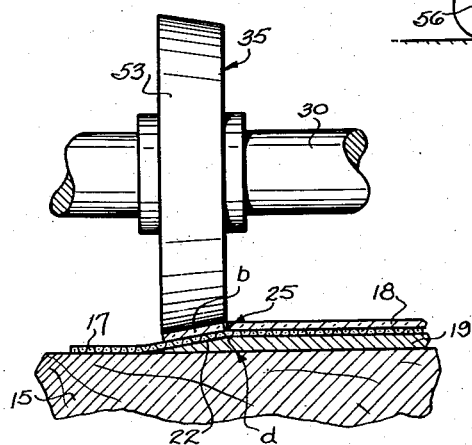
Fig. 5 is a front view of one of the cracking-off rollers showing the breaking action thereof.
Figure 10:
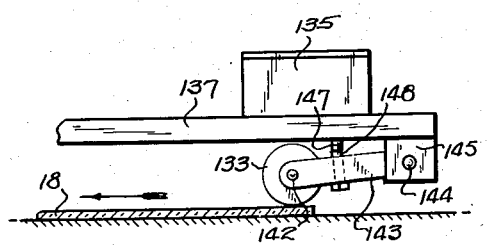
Fig. 10 is a longitudinal section taken substantially on line 10—10 of Fig. 7.
Figure 7:
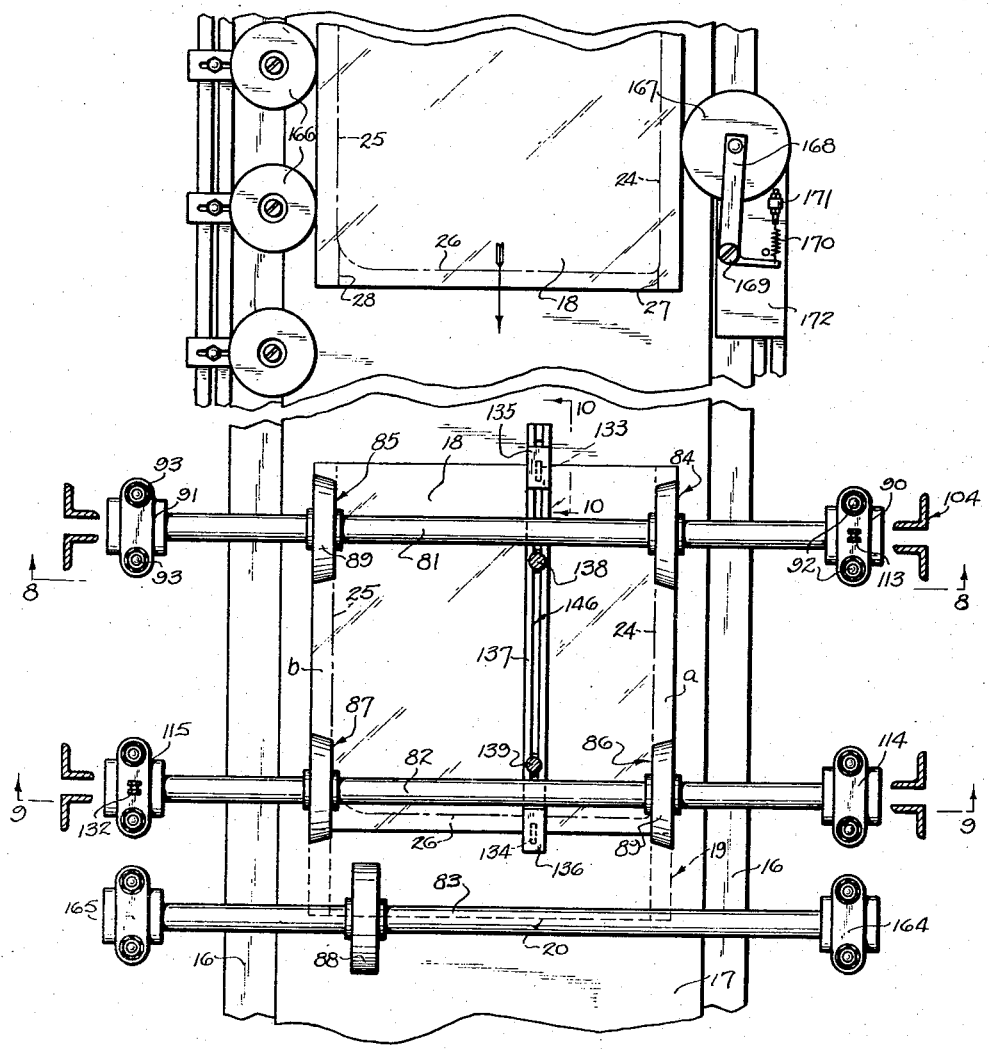
Fig. 7 is a plan view of a modified type of breaking apparatus.
Figure 11:
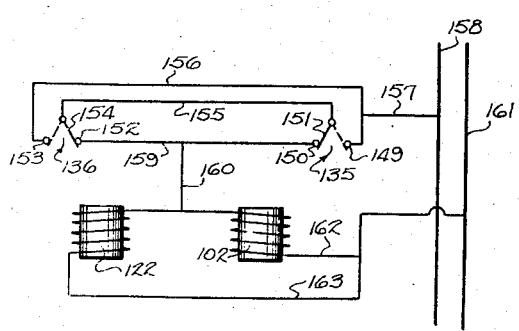
Fig. 11 is an electrical wiring diagram indicating the operation and control of the cracking-off rollers.

To this end, as soon as the cracking off of the glass sheet has taken place, the cracking-off rollers 34 and 35 are adapted to be lifted from contact with the glass and maintained in raised position as the remainder of the sheet passes therebeneath. This is accomplished by means of a solenoid 54 having operative connections with the supporting means for the cracking-off rollers and controlled by movement of the glass sheet 18 beneath a switch actuating wheel 55 (Fig. 4). The wheel 55 is mounted upon a transverse shaft or pin 56 carried at the outer end of a substantially horizontal arm 57 pivoted at its inner end as at 58 to a block 59 secured to the under side of a horizontal bar 60. The bar 60 extends longitudinally of the table 15 and is slotted as at 61 to receive a vertical supporting member 62 secured at its upper end by nuts 63 to the horizontal portion of an inverted U-shaped frame 64 straddling the table 15 and conveyor belt 17. Carried upon the outer end of the bar 60 is a switch box 65 housing a suitable switch provided with a spring pressed contact 66. Passing through the arm 57 is a set screw 67 adapted to engage the contact 66 and effect the operation of the switch. The switch is connected in circuit with the solenoid 54 so that, upon engagement of the set screw 67 with contact 66, the solenoid 54 will be energized, whereas when set screw 67 is moved out of engagement with contact 66 the solenoid will be deenergized.

The solenoid 54 is provided with a vertically-movable plunger 68 and fastened thereto is one end of a chain 69 which passes upwardly over a sprocket 70, carried by bracket 71, and is attached at its opposite end to a substantially vertical lever 72, said lever being pivoted adjacent its lower end as at 73 to the frame 64. Fastened to the lever 72 above and beneath the pivot point 73 are chains 74 and 75 trained over sprockets 76 and 77 respectively and attached to the bearings 44 and 45 in which shaft 30 is mounted. With this construction, it will be apparent that upon energization of the solenoid 54 the plunger 68 will be drawn downwardly to swing the lever 72 in a counter-clockwise direction upon pivot 73 (Fig. 3) which will serve to lift the bearings 44 and 45 and thus raise the cracking-off rollers 34 and 35 from the glass sheet. This energizing of the solenoid is caused to take place just after the glass sheet has been properly broken by the cracking-off rollers and when the forward edge of the sheet engages and lifts wheel 55. When the wheel 55 is raised, the set screw 67 will actuate contact 66 to effect the closing of the circuit through the solenoid 54. The circuit through the solenoid will be maintained closed by the glass sheet as it passes beneath wheel 55, but as soon as the wheel drops off the rear edge of the sheet the circuit through the solenoid will be automatically broken and the cracking-off rollers lowered so that they are ready for the next sheet. Therefore, the cracking-off rollers 34 and 35 engage the glass sheet only momentarily and only sufficiently long to start the cracking off of the glass along the longitudinal score lines. This results in the cracking off of the glass in substantially the same manner in which it would be done by a skilled operator.

Figure 6:
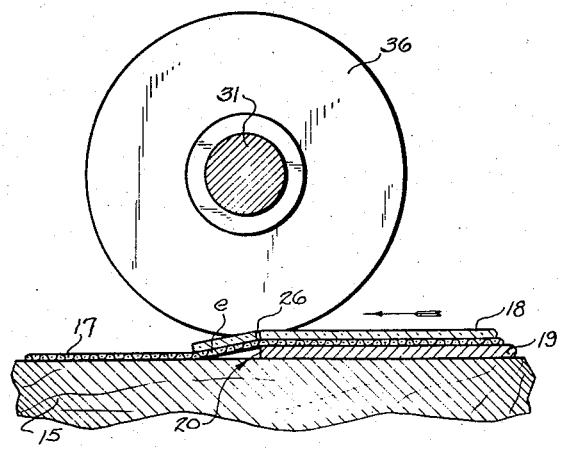
Fig. 6 is a longitudinal section taken substantially on line 6—6 of Fig. 2.
Figure 3:
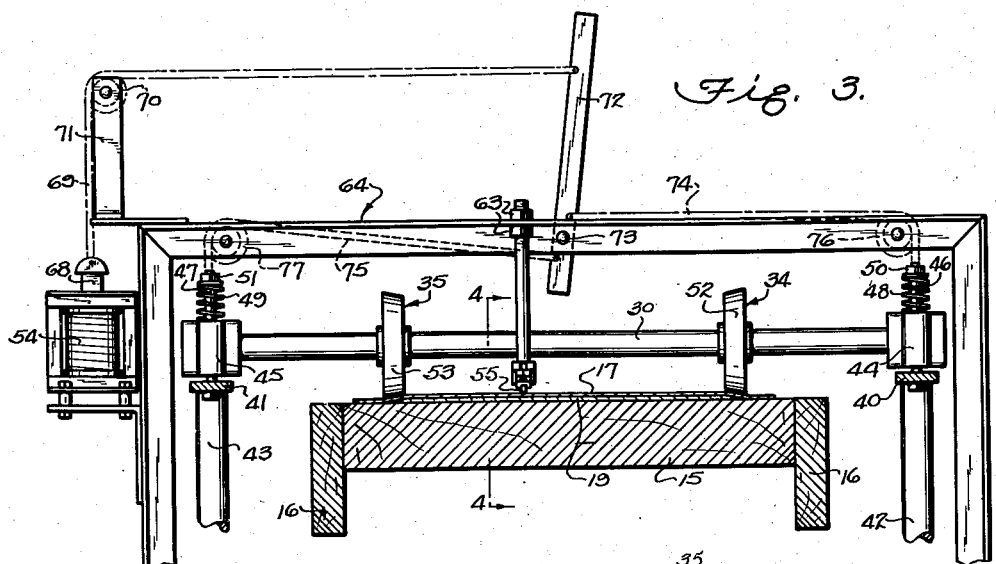
Fig. 3 is a transverse section taken substantially on line 3—3 of Fig. 2.

The shaft 31 carrying the snapping rollers 36 and 37 is mounted at its opposite ends in fixed bearings 78 and 79 also carried by the supporting members 40 and 41. Although only a single snapping roller need be used, two such rollers are here provided and, as best shown in Fig. 6, these rollers are adapted to engage the forward edge of the glass sheet 18 and to crack the said sheet along the transverse score line 26. The snapping rollers 36 and 37 simply ride over the upper surface of the glass sheet without causing any injury thereto. It will also be seen from an inspection of Fig. 2 that the rollers 36 and 37 are preferably arranged to one side of the glass sheet rather than at the longitudinal center thereof or at both sides of the longitudinal center. The rollers are arranged in this manner so that they will start the cracking off operation at one side of the sheet or, in other words, at one end of the transverse score line 26, with the break being continued along said score line in the usual manner. In this way, the rollers 36 and 37 also function to crack the glass sheet along score line 26 in substantially the same manner that it would be cracked by a skilled operator.

To facilitate the positioning of the glass sheet 18 upon conveyor belt 17 and the passage thereof forwardly beneath the hold-down rollers 32 and 33, there may be provided, adjacent one side of the conveyor belt, a plurality of horizontally aligned guide rolls 80. When the glass sheet is placed on the endless conveyor, the inner edge thereof is butted up against the guide rolls 80 which then guide the sheet forwardly beneath the hold-down rollers.

With the use of the apparatus above described, the cracking of sheets of glass along previously made score lines may be accomplished in a substantially continuous manner. The sheets, as rapidly as they are scored, can be passed beneath the breaking rollers which will automatically break the glass as it is carried forwardly. In this manner, uniform results may be obtained in the breaking of a large number of successive sheets and, in addition, clean, even breaks may be obtained with little or no danger of glass breakage or chipping or marring of the sheet edges. The hold-down rollers, cracking-off rollers and snapping rollers are preferably of rubber, rubber composition or the like. It will of course be appreciated that the apparatus is adaptable to the breaking of glass sheets of other shapes and/or sizes by the use of a cracking-off plate of the required shape and size and by positioning the hold-down rollers, cracking-off rollers, and snapping rollers accordingly upon their respective shafts. The apparatus is, however, of especial utility in the cracking of glass sheets scored in a manner similar to that illustrated in Fig. 1, and a machine for automatically scoring glass sheets in this manner is fully disclosed and claimed in my co-pending application filed of even date herewith Serial No. 296,444.

*Modified breaking apparatus illustrated in Figs. 7 to 11, inclusive*

The apparatus illustrated in Figs. 7 to 11, inclusive, is substantially the same as above described and is adapted to effect the breaking of the scored sheets of glass in substantially the same manner. The main differences, however, between the two embodiments of the invention is that in Fig. 1 only a single pair of cracking-off rollers is used and maintained in lowered position until the cracking of the glass sheet takes place, after which they are raised, whereas in Fig. 7 two pairs of cracking-off rollers are provided, each pair being pivotally mounted and adapted to effect the cracking off of one marginal edge portion of the sheet. Also, these cracking-off rollers are maintained in raised position above the glass sheet and are lowered to engage said sheet when it is moved to a predetermined position therebeneath. Further, the hold-down rollers are eliminated and only a single snapping roller employed.

With reference more particularly to Figures 7 to 11, there is provided, as in Fig. 1, the horizontal table 15 over which is trained the upper flight of the endless conveyor belt 17 for receiving and carrying the scored sheets of glass 18 forwardly into position upon the cracking-off plate 19. Mounted above the table 15 are the three parallel transverse shafts 81, 82, and 83; the shafts 81 and 82 carrying the two pairs of cracking-off rollers 84, 85 and 86, 87 respectively, while the shaft 83 carried the single snapping roller 88. The peripheries of the cracking-off rollers are beveled as at 89 to correspond to the beveled marginal portions of the cracking-off plate as above described.

Figure 8:
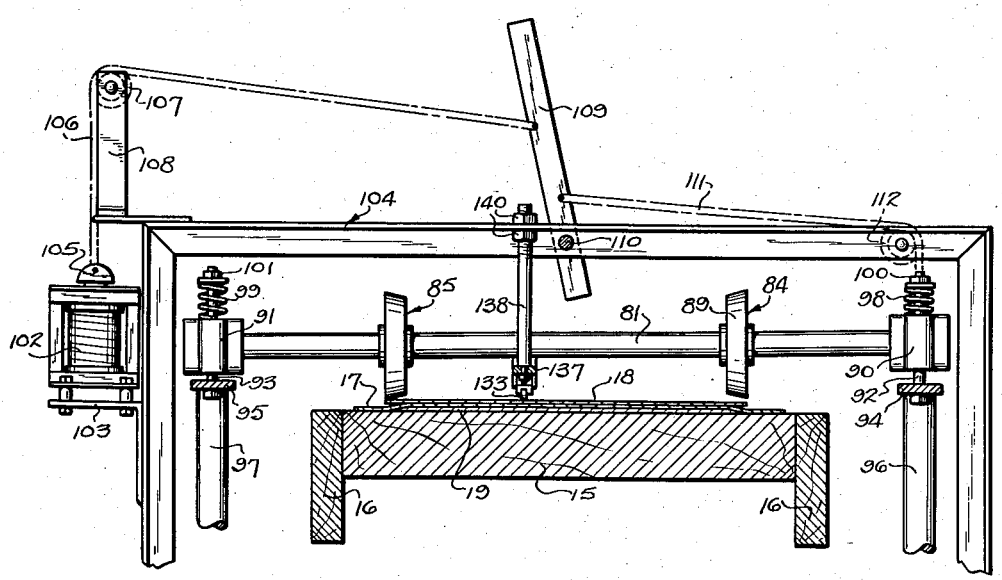
Fig. 8 is a transverse section taken substantially on line 8—8 of Fig. 7.

The shaft 81 carrying cracking-off rollers 84 and 85 is journaled at its opposite ends in bearings 90 and 91 slidably mounted upon pairs of vertical bolts 92 and 93 respectively secured to the horizontal supporting members 94 and 95 supported by posts 96 and 97. The bearings 90 and 91 are normally urged downwardly by coil springs 98 and 99 encircling the bolts 92 and 93 respectively and bearing at their upper ends against nuts 100 and 101 threaded upon said bolts. The cracking-off rollers 84 and 85 are adapted to be raised and lowered by a pivotal movement of the shaft 81. In other words, the shaft is pivotally mounted at one end upon the bolts 93 and the opposite end thereof adapted to be raised and lowered to move the cracking-off rollers vertically into and out of engagement with the glass sheet. This is accomplished, as shown in Fig. 8, by a solenoid 102 carried by a bracket 103 secured to the inverted substantially U-shaped supporting frame 104 which straddles the table 15. The solenoid 102 is provided with a vertically movable plunger 105 and attached to the upper end thereof is one end of a chain 106; said chain passing upwardly over a sprocket 107 carried by bracket 108 and fastened at its opposite end to a substantially vertical operating lever 109 adjacent the upper end thereof. The operating lever 109 is pivoted adjacent its lower end as at 110 to the frame 104. Also fastened to the operating lever 109, above pivot point 110, is one end of a chain 111 trained about a sprocket 112 and attached at its opposite end to the bearing 90 as indicated at 113 in Fig. 7.

Upon energization of the solenoid 102, the plunger 105 thereof will be drawn downwardly and the lever 109 swung to the left as shown in Fig. 8. This will result in the raising of the bearing 90 through the chain connection 111 which will cause a pivoting of the shaft 81 upon vertical pins 93 to lift the cracking-off roller 84 out of contact with the glass sheet. The cracking-off roller 85 can also be lifted entirely clear of the glass, if desired, or it can be allowed to remain in slight engagement with the edge of the sheet as shown in Fig. 8. At this time, however, the pressure of the roller 85 on the glass will not be sufficient to effect the breaking of the sheet along the score line. As soon as the solenoid 102 is deenergized, the weight of the bearing 90 and associated parts will swing the lever 109 in the opposite direction to lower the cracking-off roller 85 so that the pressure thereof upon the glass will be increased to a point sufficient to effect the cracking of the sheet along the score line 25. The cracking-off roller will also be lowered to engage the opposite edge of the sheet; but before this occurs, the said edge will have been broken off along the score line 24 by the cracking-off rollers 86 and 87 as will be more clearly hereinafter apparent.

The shaft 82 carrying the cracking-off rollers 86 and 87 is journaled at its opposite ends in bearings 114 and 115 slidable upon vertical bolts 116 and 117 respectively also carried by the horizontal supporting members 94 and 95. The bearings 114 and 115 are also normally urged downwardly by springs 118 and 119 encircling bolts 116 and 117 respectively and bearing at their upper ends against nuts 120 and 121 threaded upon said bolts. The shaft 82 is pivotally mounted at one end upon the vertical pins 116 while the raising and lowering of the opposite end thereof is controlled by a solenoid 122 carried by a bracket 123 secured to the supporting frame 124. The solenoid 122 is provided with a vertically movable plunger 125 to which is fastened one end of a chain 126 which passes upwardly around a sprocket 127 and is attached at its opposite end to a substantially vertical lever 128 adjacent the upper end thereof. The lever 128 is pivoted adjacent its lower end as at 129 to the supporting frame 124. Also fastened to the lever 128 beneath pivot points 129 is one end of a chain 130 trained about a sprocket 131 and secured at its opposite end to the bearing 115 as at 132 in Fig. 7. It will be noted that the shafts 81 and 82 are pivotally mounted at opposite sides of the endless conveyor 17.

Figure 9:
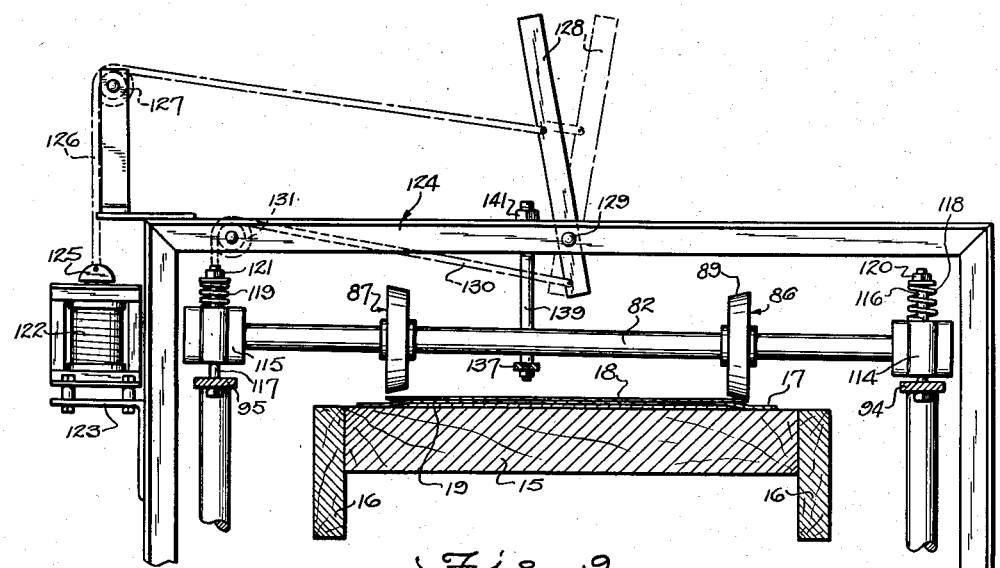
Fig. 9 is a transverse section taken substantially on line 9—9 of Fig. 7.

When the solenoid 122 is energized, the lever 128 will be swung to the full line position in Fig. 9, whereupon the bearing 115 will be raised upwardly through the chain connection 130 to tilt the shaft 82 upon the vertical pins 116 and thereby lift the cracking-off roller 87 from contact with the glass sheet. The cracking-off roller 86 can also be lifted clear of the glass sheet if desired but is shown in Fig. 9 as contacting the edge of the sheet. However, at this time the pressure of roller 86 upon the glass is not sufficient to crack the glass along the score line 25 as the sheet moves therebeneath. Upon deenergization of the solenoid 122, the weight of the bearing 115 and associated parts will swing the lever 128 to the right to lower the cracking-off roller 86 so that the pressure thereof upon the glass will be increased to a point sufficient to effect the cracking of the glass sheet along the score line 24. By the time the roller 87 contacts the glass sheet, the said sheet will have been broken along score line 25 by the cracking-off roller 85 as above descrbied.

In operation, the two shafts 81 and 82 are normally maintained in tilted position so that when the glass sheet 18 is carried beneath the cracking-off rollers, the rollers 84 and 87 will be spaced thereabove as shown in Figs. 8 and 9, while the rollers 85 and 86, if in position to contact the glass, will not exert sufficient pressure thereon to effect the cracking thereof. However, when the glass sheet is in proper position upon the cracking-off plate 19, the shafts 81 and 82 are adapted to be simultaneously lowered, at which time cracking-off roller 85 will break the glass sheet along score line 25 while cracking-off roller 89 will break the glass along score line 24. The engagement of the cracking-off rollers with the glass sheet is only momentary in that after the sheet has been properly broken the said rollers are again moved to raised position.

The energization and deenergization of the solenoids 102 and 122 is adapted to be controlled by movement of the glass sheet beneath a pair of wheels 133 and 134 adapted to actuate switches 135 and 136 respectively carried at the opposite ends of a horizontal bar 137. The bar 137 is carried by vertical supporting elements 138 and 139 secured at their upper ends to the supporting frames 104 and 124 respectively by nuts or the like 140 and 141. Each wheel 133 and 134 is rotatably mounted upon a horizontal shaft or pin 142 (Fig. 10) in the outer end of an arm 143 which is pivoted at its inner end as at 144 to a block 145 carried upon the underside of the horizontal bar 137. The bar 137 is longitudinally slotted as at 146 so that it can be adjusted horizontally to properly position the wheels 133 and 134 with respect to the cracking-off rollers. Each switch 135 and 136 is provided with a spring pressed contact 147, the actuation of which is controlled by a set screw 148 passing through the arm 143 of the respective wheel 133 or 134. The switches 135 and 136 are connected in series with one another and also in series with the solenoids 102 and 122 in the manner illustrated by the wiring diagram in Fig. 11 to which reference will now be had.

The switch 135 comprises a pair of contacts 149 and 150 between which is movable a contact plate 151, while switch 136 also includes contacts 152 and 153 between which is movable a contact plate 154. The contact plates 151 and 154 of switches 135 and 136 are connected by a wire 155, while a wire 156 runs between the contacts 149 and 153 of said switches. The wire 156 is connected by a wire 157 to the positive main line 158. The contacts 150 and 152 of switches 135 and 136 are connected by a wire 159 and leading therefrom to the solenoids 102 and 122 is a wire 160. The solenoids in turn are connected to the negative main line 161 by wires 162 and 163.

In the operation of the apparatus and when no scored sheet of glass is passing beneath the cracking-off rollers, the switches 135 and 136 are open and the solenoids 102 and 122 deenergized so that said rollers are in lowered position upon the table. At this time, the movable contact plates 151 ad 154 of switches 135 and 136 will be in engagement with contacts 150 and 152 respectively, as shown in full lines in Fig. 11. When the forward edge of the glass sheet 18 passes beneath and raises the wheel 133, the set screw 148 carried by arm 143 will engage contact 147 of switch 135 and throw the contact plate 151 thereof out of engagement with contact 150 and into engagement with contact 149. This will complete the circuit through the solenoids 102 and 122, causing the energization thereof and the simultaneous raising of the cracking-off rollers 84, 85 and 86, 87.

At this time, the current will pass from the positive main line 158 through wire 157, contact plate 151 of switch 135, wire 155, contact plate 154 of switch 136, and wires 159 and 160 to the solenoids, and thence from said solenoids through wires 162 and 163 to the negative main line 161. The solenoids will remain energized and the cracking-off rollers in elevated position until the forward edge of the glass sheet lifts the wheel 134 to cause actuation of the switch 136. Actuation of switch 136 will cause the conduit plate 154 thereof to be moved out of engagement with contact 152 and into engagement with contact 153. This will again break the circuit through the solenoids, causing the deenergization thereof and the lowering of the cracking-off rollers to effect the breaking of the glass sheet along the score lines 24 and 25 as described above. When the forward edge of the glass sheet engages wheel 134, it will be properly positioned upon the cracking-off plate 19 and the wheel 133 will still be held in elevated position by the rear edge of the sheet. As soon as the rear edge of the sheet passes beyond wheel 133, however, the contact plate 151 of switch 135 will be automatically returned into engagement with contact 150 to again complete the circuit through the solenoids and effect the raising of the cracking-off rollers.

At this time, the current will pass from the positive main line through wires 157 and 156, contact plate 154 of switch 136, wire 155, contact plate 151 of switch 135, and wires 159 and 160 to the solenoids, and thence from the solenoids to the negative main line through wires 162 and 163. In this way, the cracking-off rollers are maintained in lowered position only momentarily or, in other words, only sufficiently long to start the desired cracking off of the marginal portions of the glass sheet. After the sheet passes beyond the wheel 134, the contact plate 154 of switch 136 will be automatically returned into engagement with contact 152 to again break the circuit through the solenoids and thereby cause a lowering of the cracking-off rollers so that they are in position for the next breaking cycle. In practice, when the cracking-off rollers are lowered, the roller 89 will initially engage the marginal portion $a$ and the roller 85 the marginal portion $b$ of the glass sheet at the forward and rear edges of the sheet respectively.

The shaft 83 carrying snapping roller 88 is journaled at its opposite ends in fixed bearings 164 and 165. After the glass sheet passes beneath the cracking-off rollers, it passes beneath roller 88 and this roller exerts sufficient pressure thereon to cause the cracking of the sheet along the transverse score line 26. As will be noted in Fig. 7, the roller 88 is preferably positioned to one side of the longitudinal center of the sheet so as to facilitate the cracking off operation.

In order to accurately position the glass sheet upon the endless conveyor belt 17 and guide it beneath the breaking apparatus, there may be carried along one side of the table 15 a plurality of horizontally aligned, freely rotatable guide rollers 166, against which the inner side edge of the glass sheet is adapted to abut. There may also be positioned at the opposite side of the table a plurality of rollers 167 spring pressed to yieldably maintain the sheet in engagement with the guide rollers 166 as said sheet is carried forwardly. Only one roller 167 has been shown and this roller is carried upon one end of an angle bracket 168 pivoted as at 169, said roller being normally urged inwardly about said pivot by a tension spring 170 connected at one end to the opposite end of angle lever 168 and at its opposite end to a lug 171 on bracket plate 172 also carried by the table 15.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. In an apparatus for automatically breaking glass sheets after they have been scored along a predetermined line of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, and a cracking-off element mounted above the said endless conveyor and adapted to engage the glass sheet when in position upon said cracking-off plate to break the same along the score line.

2. In an apparatus for automatically breaking glass sheets after they have been scored along a predetermined line of cut, a flexible endless conveyor having an upper run for supporting the scored glass sheet horizontally and for carrying it forwardly, a stationary cracking-off plate arranged beneath the upper run of the endless conveyor and having a flat upper surface onto which the glass sheet is carried by said endless conveyor, the marginal edge portion of the sheet outwardly of the score line being adapted to project beyond the flat upper surface of said cracking-off plate, and a cracking-off element mounted above the said endless conveyor and adapted to engage the marginal edge portion of the glass sheet outwardly of the score line when said sheet is in position upon said cracking-off plate to break the same along the score line.

3. In an apparatus for automatically breaking glass sheets after they have been scored along a predetermined line of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, said cracking-off plate having a flat upper surface and a beveled marginal edge portion, the marginal edge portion of the sheet outwardly of the score line overlying the beveled marginal edge portion of said cracking-off plate, and a cracking-off element mounted above the said endless conveyor and having a beveled portion disposed opposite the beveled portion of said cracking-off plate and adapted to engage the marginal edge portion of the sheet outwardly of the score line when said sheet is in position upon said cracking-off plate to break the same along the score line.

4. In an apparatus for automatically breaking glass sheets after they have been scored along predetermined lines of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, and a pair of cracking-off rollers mounted above the said endless conveyor and adapted to engage the glass sheet when in position upon said cracking-off plate to break the same along the score lines.

5. In an apparatus for automatically breaking glass sheets after they have been scored along predetermined lines of cut, a flexible endless conveyor having an upper run for supporting the scored glass sheet horizontally and for carrying it forwardly, a stationary cracking-off plate arranged beneath the upper run of the endless conveyor and having a flat upper surface onto which the glass sheet is carried by said endless conveyor, the marginal edge portions of the sheet outwardly of the score lines being adapted to project beyond the flat upper surface of said cracking-off plate, and a pair of cracking-off rollers mounted above the said endless conveyor and adapted to engage the edge portions of the glass sheet outwardly of the score lines when said sheet is in position upon said cracking-off plate to break the same along the score lines.

6. In an apparatus for automatically breaking glass sheets after they have been scored along predetermined lines of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, said cracking-off plate having a flat upper surface and beveled marginal edge portions, the marginal edge portions of the sheet outwardly of the score lines overlying the beveled marginal edge portions of said cracking-off plate, and a pair of cracking-off rollers mounted above the said endless conveyor and having beveled portions disposed opposite the beveled portions of said cracking-off plate and adapted to engage the marginal edge portions of the glass sheet outwardly of the score lines when said sheet is in position upon said cracking-off plate to break the same along the score lines.

7. In an apparatus for automatically breaking glass sheets after they have been scored along a predetermined line of cut, a flexible endless conveyor having an upper run for supporting the scored glass sheet horizontally and for carrying it forwardly, a stationary cracking-off plate onto which the glass sheet is arranged beneath the upper run of the endless conveyor and carried by said endless conveyor, a cracking-off element mounted above the said endless conveyor and adapted to engage the glass sheet when in position upon said cracking-off plate to break the same along the score line, and means for moving the said cracking-off element vertically relative to the said cracking-off plate.

8. In an apparatus for automatically breaking glass sheets after they have been scored along a predetermined line of cut, a flexible endless conveyor having an upper run for supporting the scored glass sheet horizontally and for carrying it forwardly, a stationary cracking-off plate arranged beneath the upper run of the endless conveyor and having a flat upper surface onto which the glass sheet is carried by said endless conveyor, the marginal edge portion of the sheet outwardly of the score line being adapted to project beyond the flat upper surface of said cracking-off plate, a cracking-off element mounted above the said endless conveyor and adapted to engage the marginal edge portion of the glass sheet outwardly of the score line when said sheet is in position upon said cracking-off plate to break the same along the score line, and means controlled by movement of the glass sheet to effect the raising and lowering of the said cracking-off element relative to the said cracking-off plate.

9. In an apparatus for automatically breaking glass sheets after they have been scored along a predetermined line of cut, means for supporting the scored glass sheet horizontally and for carrying it forwardly, a cracking-off plate onto which the glass sheet is passed, said cracking-off plate having a flat upper surface and a beveled marginal edge portion, the marginal edge portion of the sheet outwardly of the score line overlying the beveled marginal edge portion of said cracking-off plate, a cracking-off element mounted above the sheet supporting means and having a beveled portion disposed opposite the beveled portion of said cracking-off plate and adapted to engage the marginal edge portion of the sheet outwardly of the score line when said sheet is in position upon said cracking-off plate to break the same along the score line, and electrically operated means actuated by the forward edge of the glass sheet to effect the raising and lowering of the said cracking-off element relative to the said cracking-off plate.

10. In an apparatus for automatically breaking glass sheets after they have been scored along predetermined lines of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, a pair of cracking-off rollers mounted above the said endless conveyor and adapted to engage the glass sheet when in position upon said cracking-off plate to break the same along the score lines, and means for moving the said cracking-off rollers vertically relative to the said cracking-off plate.

11. In an apparatus for automatically breaking glass sheets after they have been scored along predetermined lines of cut, a flexible endless conveyor having an upper run for supporting the scored glass sheet horizontally and for carrying it forwardly, a stationary cracking-off plate arranged beneath the upper run of the endless conveyor and having a flat upper surface onto which the glass sheet is carried by said endless conveyor the marginal edge portions of the sheet outwardly of the score lines being adapted to project beyond the flat upper surface of said cracking-off plate, a pair of cracking-off rollers mounted above the said endless conveyor and adapted to engage the edge portions of the glass sheet outwardly of the score lines when said sheet is in position upon said cracking-off plate to break the same along the score lines, and means controlled by movement of the glass sheet to effect the raising and lowering of the said cracking-off rollers relative to the said cracking-off plate.

12. In an apparatus for automatically breaking glass sheets after they have been scored along predetermined lines of cut, means for supporting the scored glass sheet horizontally and for carrying it forwardly, a cracking-off plate onto which the glass sheet is passed, said cracking-off plate having a flat upper surface and beveled marginal edge portions, the marginal edge portions of the sheet outwardly of the score lines overlying the beveled marginal edge portions of said cracking-off plate, a pair of cracking-off rollers mounted above the sheet supporting means and having beveled portions disposed opposite the beveled portions of said cracking-off plate and adapted to engage the marginal edge portions of the glass sheet outwardly of the score lines when said sheet is in position upon said cracking-off plate to break the same along the score lines, and electrically operated means actuated by the forward edge of the glass sheet to effect the raising and lowering of the said cracking-off rollers relative to the said cracking-off plate.

13. In an apparatus for automatically breaking glass sheets after they have been scored along a predetermined line of cut, means for supporting the scored glass sheet horizontally and for carrying it forwardly, a cracking-off plate onto which the glass sheet is passed, a cracking-off element mounted above the sheet supporting means and adapted to engage the glass sheet when in position upon said cracking-off plate to break the same along the score line, means for moving said cracking-off element comprising magnetic means and operative connections between said magnetic means and the cracking-off element, and means connected in series with said magnetic means and actuated by the forward edge of the glass sheet for causing the energization of the said magnetic means to effect the raising of the said cracking-off element.

14. In an apparatus for automatically breaking glass sheets after they have been scored along predetermined lines of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, a pair of cracking-off rollers mounted above the said endless conveyor and adapted to engage the glass sheet when in position upon said cracking-off plate to break the same along the score lines, means for moving said cracking-off rollers vertically relative to said cracking-off plate comprising magnetic means and operative connections between said magnetic means and the cracking-off rollers, and means connected in series with said magnetic means and actuated by the forward edge of the glass sheet for causing the energization of the said magnetic means to effect the raising of the said cracking-off rollers.

15. In an apparatus for automatically breaking glass sheets after they have been scored along predetermined lines of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, a pair of cracking-off rollers mounted above the said endless conveyor and adapted to engage the glass sheet when in position upon said cracking-off plate to break the same along the score lines, means for moving said cracking-off rollers vertically relative to said cracking-off plate comprising a solenoid and operative connections between said solenoid and the cracking-off rollers, and means connected in series with said solenoid and actuated by the forward edge of the glass sheet for causing the energization of the said solenoid to effect the raising of the said cracking-off rollers, said solenoid being automatically deenergized to cause a lowering of the said cracking-off rollers when the glass sheet passes out of engagement with said last-named means.

16. In an apparatus for automatically breaking glass sheets after they have been scored along predetermined lines of cut, means for supporting the scored glass sheet horizontally and for carrying it forwardly, a cracking-off plate onto which the glass sheet is passed, two pairs of cracking-off rollers mounted above the sheet supporting means and adapted to engage the glass sheet when in position upon said cracking-off plate to break the same along the score lines, means for moving said pairs of cracking-off rollers vertically relative to said cracking-off plate comprising magnetic means for each pair of cracking-off rollers and operative connections between said magnetic means and the respective pair of rollers, and means connected in series with said magnetic means and actuated by the forward edge of the glass sheet for causing the energization of the said magnetic means to effect the raising of the said cracking-off rollers before the glass sheet passes onto the cracking-off plate and for also causing the subsequent deenergization of said magnetic means when the glass sheet is in a predetermined position upon the cracking-off plate to cause the lowering of said cracking-off rollers and the breaking of the glass sheet along the score lines.

17. In an apparatus for automatically breaking glass sheets after they have been scored along predetermined lines of cut, means for supporting the scored glass sheet horizontally and for carrying it forwardly, a cracking-off plate onto which the glass sheet is passed, two pairs of cracking-off rollers mounted above the sheet supporting means and adapted to engage the glass sheet when in position upon said cracking-off plate to break the same along the score lines, means for moving said pairs of cracking-off rollers vertically relative to said cracking-off plate comprising a solenoid for each pair of cracking-off rollers and operative connections between said solenoid and the respective pair of rollers, control means connected in series with said solenoids and actuated by the forward edge of the glass sheet for causing the energization of said solenoids to effect the raising of the said cracking-off rollers before the glass sheet passes onto the cracking-off plate, and a second control means also connected in series with said solenoids and engageable by the forward edge of the glass sheet when said sheet reaches a predetermined position upon said cracking-off plate for causing the deenergization of said solenoids and the lowering of said cracking-off rollers to break the glass sheet along the score lines.

18. In an apparatus for automatically breaking glass sheets after they have been scored along predetermined lines of cut, means for supporting the scored glass sheet horizontally and for carrying it forwardly, a cracking-off plate onto which the glass sheet is passed, two pairs of cracking-off rollers mounted above the sheet supporting means and adapted to engage the glass sheet when in position upon said cracking-off plate to break the same along the score lines, means for moving said pairs of cracking-off rollers vertically relative to said cracking-off plate comprising a solenoid for each pair of cracking-off rollers and operative connections between said solenoid and the respective pair of rollers, control means connected in series with said solenoids and actuated by the forward edge of the glass sheet for causing the energization of said solenoids to effect the raising of the said cracking-off rollers before the glass sheet passes onto the cracking-off plate, and a second control means also connected in series with said solenoids and engageable by the forward edge of the glass sheet when said sheet reaches a predetermined position upon said cracking-off plate for causing the deenergization of said solenoids and the lowering of said cracking-off rollers to break the glass sheet along the score lines, said solenoids being again automatically energized to raise the cracking-off rollers when the rear edge of the glass sheet passes out of engagement with said first-named control means and the said solenoids being again automatically deenergized to lower the said cracking-off rollers to initial position when the rear edge of the glass sheet passes out of engagement with said second-named control means.

19. In an apparatus for automatically breaking glass sheets after they have been scored along a predetermined line of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, and a snapping roller mounted above the said endless conveyor and adapted to engage the forward edge of the glass sheet when said sheet is in position upon said cracking-off plate to effect the breaking of the same along the score line.

20. In an apparatus for automatically breaking glass sheets after they have been scored along a predetermined line of cut, a flexible endless conveyor having an upper run for supporting the scored glass sheet horizontally and for carrying it forwardly, a stationary cracking-off plate arranged beneath the upper run of the endless conveyor and onto which the glass sheet is carried by said endless conveyor, and a snapping roller mounted above the said endless conveyor and adapted to engage the forward edge of the glass sheet when said sheet is in position upon said cracking-off plate to effect the breaking of the same along the score line, said snapping roller being positioned to engage the glass sheet adjacent one end of said score line.

JOSEPH R. MORRIS.